United States Patent
Fan et al.

(10) Patent No.: US 11,977,245 B2
(45) Date of Patent: May 7, 2024

(54) OPTICAL WAVEGUIDE UNIT, ARRAY, AND FLAT LENS

(71) Applicant: ANHUI EASPEED TECHNOLOGY CO., LTD., Anhui (CN)

(72) Inventors: Chao Fan, Anhui (CN); Dongcheng Han, Anhui (CN)

(73) Assignee: ANHUI EASPEED TECHNOLOGY CO., LTD., Anhui (CN)

( * ) Notice: Subject to any disclaimer, the term of this patent is extended or adjusted under 35 U.S.C. 154(b) by 316 days.

(21) Appl. No.: 17/449,676

(22) Filed: Oct. 1, 2021

(65) Prior Publication Data

US 2022/0019013 A1 Jan. 20, 2022

Related U.S. Application Data

(63) Continuation of application No. PCT/CN2019/092939, filed on Jun. 26, 2019.

(51) Int. Cl.
*G02B 30/56* (2020.01)
*G02B 17/00* (2006.01)

(52) U.S. Cl.
CPC ........... *G02B 30/56* (2020.01); *G02B 17/006* (2013.01)

(58) Field of Classification Search
CPC .............................. G02B 17/006; G02B 30/56
See application file for complete search history.

(56) References Cited

U.S. PATENT DOCUMENTS

| 2011/0181949 A1 | 7/2011 | Hashikawa |
| 2015/0029585 A1 | 1/2015 | Imamura et al. |

FOREIGN PATENT DOCUMENTS

| CN | 107340567 | 11/2017 |
| CN | 107807417 | 3/2018 |
| CN | 109917513 | 6/2019 |
| EP | 3933465 | 1/2022 |
| JP | 2005-15790 | 1/2005 |
| JP | 2016224110 | 12/2016 |

OTHER PUBLICATIONS

English translation of the Chinese patent document CN 109917513 A, published on Jun. 21, 2019 (Year: 2019).*
International Search Report from corresponding PCT Appln. No. PCT/CN2019/092939, dated Apr. 10, 2020.
Extended European Search Report from related Application No. 19935738.5 dated Jan. 24, 2022.

* cited by examiner

*Primary Examiner* — Sung H Pak

(74) *Attorney, Agent, or Firm* — Grossman, Tucker, Perreault & Pfleger, PLLC

(57) ABSTRACT

An optical waveguide unit includes a plurality of reflecting units being the same in structure, and each reflecting unit being any one or a combination of any two of: a metal layer, a total reflecting layer, and a medium reflecting layer; and a plurality of sub waveguides stacked on each other, each of two sides of each sub waveguide being provided with one reflecting unit, at least two of the plurality of sub waveguides having different heights in a stacking direction of the plurality of sub waveguides, and the different heights of the sub waveguides being corresponding to different incident angle directions. The present disclosure also provides an optical waveguide array and a flat lens.

15 Claims, 7 Drawing Sheets

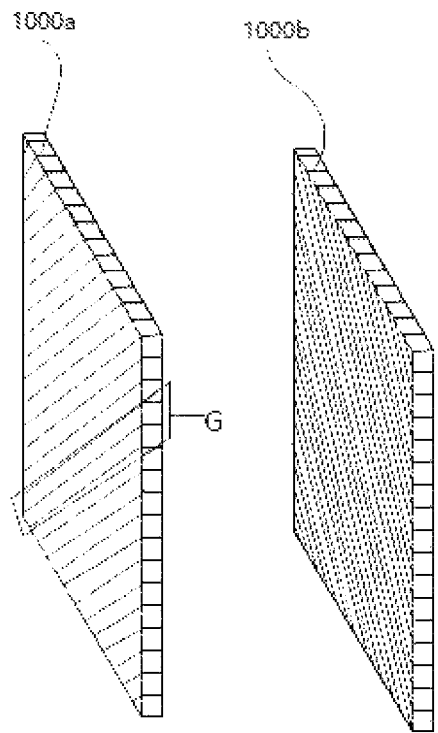
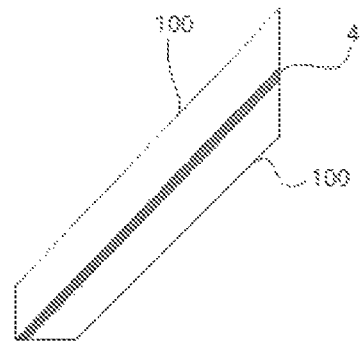
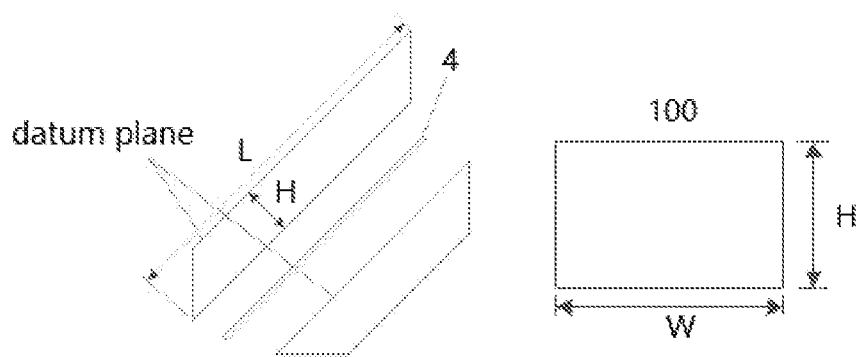
FIG. 1a  FIG. 1b
FIG. 2a  FIG. 2b

OPTICAL WAVEGUIDE UNIT, ARRAY, AND FLAT LENS

TECHNICAL FIELD

The present disclosure relates to the field of optical display, and more particularly, to an optical waveguide unit, an optical waveguide array including optical waveguide units, and a flat lens including optical waveguide arrays.

BACKGROUND

Requirements on imaging characteristics are increasing with the development of imaging and display technologies. On one hand, a higher resolution is required and a picture sharpness observed is ensured as well as a small distortion requirement is also satisfied. On the other hand, three-dimensional (3D) display characteristics and naked-eye 3D holographic display are both required. Imaging technologies in the related art on one hand mainly adopts a lens for imaging, which is mainly limited by a field of view and an aperture, has optical aberrations such as spherical aberration, coma aberration, astigmatism, field curvature, distortion, chromatic aberration, and is greatly limited in the field of large-field and large-aperture imaging display. Most of the naked-eye 3D display technologies in the related art on the other hand may realize the 3D sense by adjusting a parallax between left eye and right eye, but may not be the actual 3D display technologies.

SUMMARY

The present disclosure aims to at least solve one of the technical problems in the related art. For this purpose, the present disclosure provides an optical waveguide unit.

An optical waveguide unit according to embodiments of the present disclosure includes: a plurality of reflecting units being the same in structure, each reflecting unit being any one or a combination of any two of: a metal layer, a total reflecting layer, and a medium reflecting layer; and a plurality of sub waveguides stacked on each other, each of two sides of each sub waveguide being provided with one reflecting unit, at least two of the plurality of sub waveguides having different heights in a stacking direction of the plurality of sub waveguides, and the different heights of the sub waveguides being corresponding to different incident angle directions.

With the optical waveguide unit according to embodiments of the present disclosure, the sub waveguides with the plurality of heights are set and different visual angles are modulated under the plurality of heights, so that the energy of a plurality of lossless region angles may be allocated, and the uniformity of the energy of an imaging light beam in the whole imaging visual angle range may be improved.

According to some embodiments of the present disclosure, the height of each sub waveguide ranges from 0.1 mm to 5 mm Therefore, not only can the imaging quality of the optical waveguide array be prevented from being influenced by diffraction, but also the clear imaging of the optical waveguide array on the object point array can be improved.

According to some embodiments of the present disclosure, a refractive index of each sub waveguide is n>1.46.

According to some embodiments of the present disclosure, there are a plurality of categories for the plurality of sub waveguides, heights of sub waveguides in each category are the same, and a height of a $i^{th}$ category satisfies:

$$H_i = W \cdot \tan(\arcsin(\sin(\theta_i)/n))/\sqrt{2},$$

where $\theta_i$ is a predetermined angle selected within an observation angle range, n is a refractive index of the sub waveguide; in which heights of the plurality of categories are inversely proportional to numbers of corresponding sub waveguides in the plurality of categories.

According to some embodiments of the present disclosure, the reflecting unit is one of: the metal layer, the metal layer and the total reflecting layer, and the metal layer and the medium reflecting layer.

According to some embodiments of the present disclosure, the metal layer is made of silver, aluminum, or chromium, and height hm of the metal layer satisfies: 0.001 mm<hm<0.1 mm.

According to some embodiments of the present disclosure, when the reflecting unit is the metal layer and the total reflecting layer or the metal layer and the medium reflecting layer, a surface of the metal layer facing the corresponding sub waveguide has a preset roughness; and/or the metal layer is a metal film layer blackened by oxidation.

According to some embodiments of the present disclosure, the reflecting unit is the total reflecting layer, and a refractive index range $n_{ei}$ of the total reflecting layer is calculated by a following formula of:

$$n_{ei} = \sqrt{n^2 - 0.5 \cdot \sin(\theta_{ei})^2},$$

where, $\theta_{ei}$ is a maximum incident angle of a surface of the optical waveguide unit when a total reflection condition is satisfied, and n is a refractive index of the sub waveguide.

According to some embodiments of the present disclosure, height hr of the total reflecting layer satisfies: 0.004 mm<hr<(0.1H), where H is a height of the corresponding sub waveguide where the total reflection layer is located.

According to some embodiments of the present disclosure, the reflecting unit is an interference type medium reflecting layer, the interference type medium reflecting layer includes one or more transparent medium film layers of the following types: a ¼ wavelength film, a ½ wavelength film, in which an optical thickness of the ¼ wavelength film is ¼ of an incident light wavelength, and an optical thickness of the ½ wavelength film is ½ of the incident light wavelength; the optical thickness of the film layer $T = n_g \cdot l$, where $n_g$ is a refractive index of material of the film layer, and l is a thickness of the film layer.

According to some embodiments of the present disclosure, height hj of the medium reflecting layer satisfies: hj<(0.1H), where H is a height of the corresponding sub waveguide where the medium reflection layer is located.

An optical waveguide array according to embodiments of a second aspect of the present disclosure includes: a plurality of optical waveguide units according to embodiments of the first aspect of the present disclosure, each optical waveguide unit having a rectangular cross section, and the plurality of optical waveguide units being joined in parallel; an outer contour of the optical waveguide array is rectangular, and an extending direction of the optical waveguide unit and at least two sides of the outer contour of the optical waveguide array form an angle of 30 to 60 degrees.

According to some embodiments of the present disclosure, the extending direction of the optical waveguide unit and the at least two sides of the outer contour of the optical waveguide array form an angle of 45 degrees.

According to some embodiments of the present disclosure, the plurality of optical waveguide units are joined through an adhesive layer, and a thickness of the adhesive layer is more than 0.001 mm.

A flat lens according to embodiments of a third aspect of the present disclosure includes two transparent substrates, each transparent substrate having two optical surfaces; two optical waveguide arrays according to embodiments of the second aspect of the present disclosure, in which the two optical waveguide arrays are arranged between the two transparent substrates by means of glue, and optical waveguide extending directions of the two optical waveguide arrays are arranged orthogonally.

According to some embodiments of the present disclosure, an optical surface of each transparent substrate far away from the optical waveguide array is provided with an antireflection film.

Additional aspects and advantages of the present disclosure will be set forth in part in the following description which follows, and some will become obvious from the following description or learned through practice of the present disclosure.

BRIEF DESCRIPTION OF DRAWINGS

The above and/or additional aspects and advantages of the present disclosure will become apparent and readily appreciated from the following description of embodiments, taken in conjunction with the accompanying drawings, in which:

FIG. 1a is a schematic view of an optical waveguide array according to embodiments of the present disclosure, in which two optical waveguide arrays are arranged orthogonally;

FIG. 1b is an enlarged view of FIG. 1a at block G;

FIG. 2a is a schematic view of two sub waveguides mated by an adhesive layer illustrated in FIG. 1b;

FIG. 2b is a cross-sectional view of any sub waveguide of FIG. 2a, in which W is a width, and H is a height;

Figure 3:
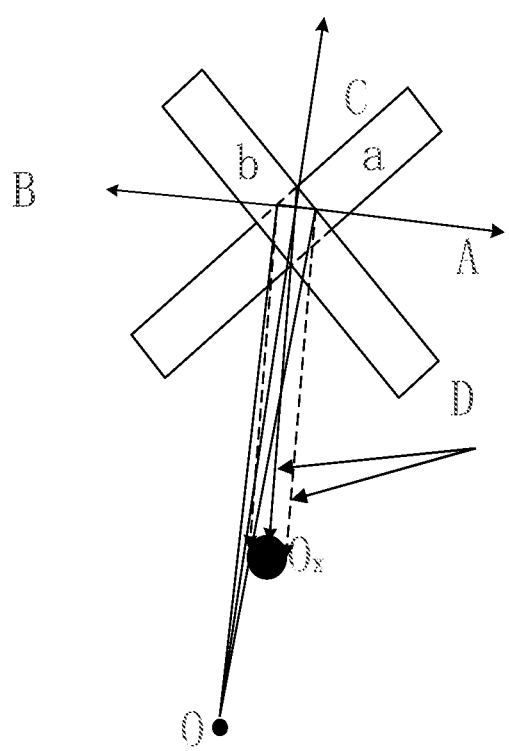
FIG. 3 is a schematic view of a principle for modulating light in an overlapping region when two optical waveguide units are placed orthogonally according to embodiments of the present disclosure.
Figure 4:
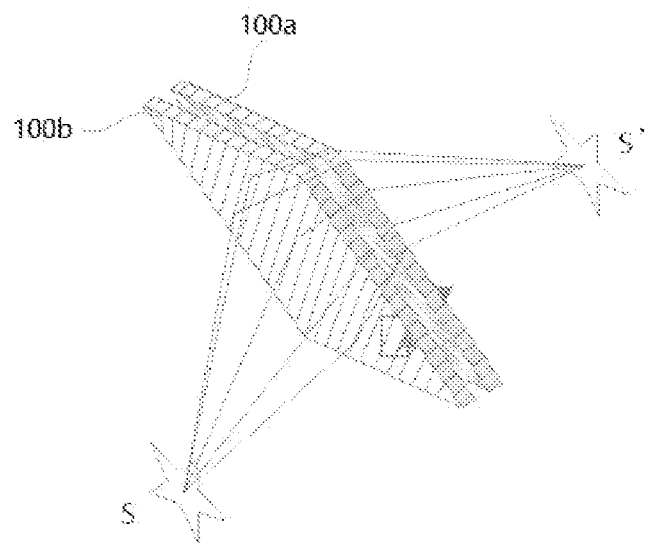
FIG. 4 is a schematic view of a principle for imaging when two optical waveguide arrays are orthogonal according to embodiments of the present disclosure.

The reference numerals:
optical waveguide array 1000a, 1000b;
optical waveguide unit 100; reflecting unit 1; sub waveguide 2;
transparent substrate 2000; antireflection film 2100.

DESCRIPTION OF EMBODIMENTS

The embodiments of the present disclosure will be described in detail below. The embodiments described with reference to the accompanying drawings are illustrative. The embodiments of the present disclosure will be described in detail below.

In the description of the present disclosure, it is to be understood that the terms "height", "thickness", "top", "bottom", etc. indicate orientations or positional relationships based on those shown in the drawings, and are only for convenience and simplicity of description, but do not indicate or imply that the devices or elements referred to must have particular orientations, be constructed and operated in particular orientations, and thus, are not to be construed as limiting the present disclosure. In the description of the present disclosure, the features defined as "first" and "second" may include at least one of the features. In the description of the present disclosure, the meaning of "a plurality of" may be at least two.

An optical waveguide array according to embodiments of the present disclosure will be described first with reference to FIG. 1 to 5.

As illustrated in FIGS. 1a and 1b, an optical waveguide array 1000a and an optical waveguide array 1000b each includes a plurality of optical waveguide units 100. Each optical waveguide unit 100 has a rectangular cross section. The plurality of optical waveguide units 100 are joined in parallel. The outer contour of the optical waveguide array is rectangular, and the extending direction of the optical waveguide unit 100 and at least two sides of the outer contour of the optical waveguide array form an angle of 30 to 60 degrees. Alternatively, the extending direction of the optical waveguide unit 100 and the at least two sides of the outer contour of the optical waveguide array form an angle of 45 degrees. The "at least two sides" may be two sides of the outer contour of the optical waveguide array parallel to each other, may also be two sides of the outer contour of the optical waveguide array perpendicular to each other, or may be four sides of the outer contour of the optical waveguide array. Of course, the present disclosure is not limited to this, and a large size requirement may be achieved by splicing a plurality of optical waveguide arrays when a large screen is displaying. The overall shape of the optical waveguide array is set according to application scene requirements.

In the example illustrated in FIG. 1a, the outer contours of the optical waveguide arrays 1000a, 1000b are both rectangular. As illustrated in FIG. 1b, the optical waveguide unit extending between two opposite corners of the rectangle has the longest length, and the optical waveguide units 100 located at the two opposite corners have the triangular shape and the shortest length. The middle optical waveguide units are in a trapezoidal or parallelogram structure, and the lengths of the single optical waveguides are unequal. In some further alternative examples, the optical waveguide units located at both sides of the optical waveguide unit extending between two opposite corners of the rectangle may be symmetrically disposed with reference to the optical waveguide unit extending between two opposite corners of the rectangle.

Optical waveguide extending directions of the two optical waveguide arrays 1000a, 1000b are orthogonally arranged to form an equivalent flat lens with a negative refractive index. Extending direction of each optical waveguide in the optical waveguide array 1000a is also orthogonal to extending direction of each optical waveguide in the optical waveguide array 1000b.

Figure 5:
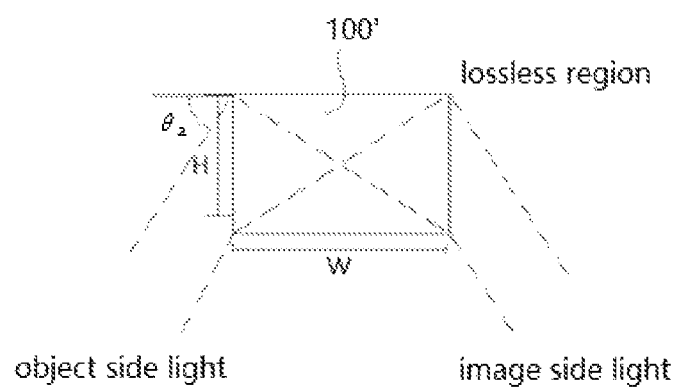
FIG. 5 is a schematic view of a lossless region of an angle incident light $\theta_a$ of an equivalent optical waveguide unit in the prior art.

FIG. 3 is a schematic view showing a principle for modulating light in an overlapping region when two optical waveguide units are placed orthogonally, in which a and b denote two optical waveguide units, A, B denote odd-order reflected light beams, C denotes transmitted stray light, D denotes an imaging light beam, O denotes an object-side light source point, and Ox denotes an image-side imaging point. Therefore, when the two optical waveguide units are orthogonally placed, the object-side light beam and the image-side light beam are mirror-symmetric with respect to the equivalent flat lens with the negative refractive index, and a negative refractive index phenomenon occurs, thereby realizing imaging of the flat lens, as illustrated in FIG. 5.

In some embodiments of the present disclosure, as illustrated in FIG. 2a, the plurality of optical waveguide units 100 are joined through an adhesive layer 4, and a thickness of the adhesive layer 4 is more than 0.001 mm. The adhesive layer 4 is, for example, a photosensitive adhesive or a heat-sensitive adhesive.

The optical waveguide unit according to embodiments of the present disclosure is described below with reference to FIG. 5 to 12.

The optical waveguide unit 100 according to embodiments of the present disclosure includes a plurality of reflection units 1 and a plurality of sub waveguides 2 stacked on each other. Each of two sides of each sub waveguide 2 is provided with one reflecting unit 1. Each reflecting unit 1 is any one or a combination of any two of: a metal layer 1a, a total reflecting layer 1b, and a medium reflecting layer 1c. That is, the reflecting unit 1 may have the following mode: the metal layer 1a, the total reflecting layer 1b, the medium reflecting layer 1c, a combination of the metal layer 1a and the total reflecting layer 1b, a combination of the metal layer 1a and the medium reflecting layer 1c, and a combination of the total reflecting layer 1b and the medium reflecting layer 1c. The reflecting units 1 in the same optical waveguide unit have the same structure, that is, they are all metal layers 1a, or combinations of the metal layer 1a and the total reflecting layer 1b.

At least two of the plurality of sub waveguides 2 have different heights in the stacking direction of the plurality of sub waveguides 2, and the different heights of the sub waveguides 2 correspond to different incident angle directions.

The specific principle of the optical waveguide unit 100 according to embodiments of the present disclosure will be described below.

Figure 6:
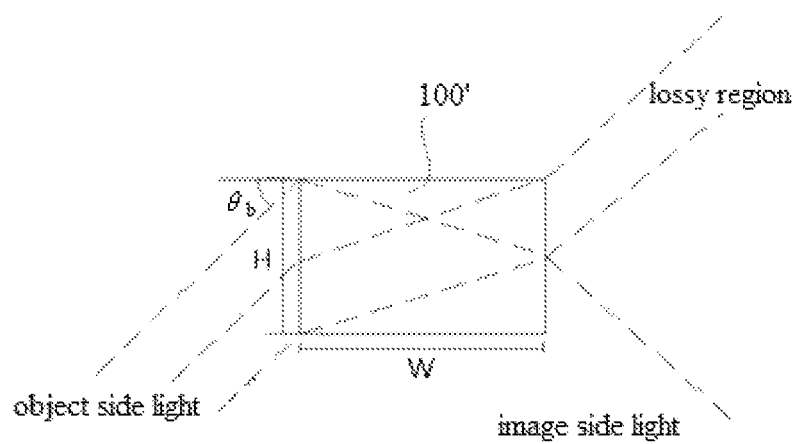
FIG. 6 is a schematic view of a lossless region of an angle incident light $\theta_b$ of an equivalent optical waveguide unit in the prior art.
Figure 7:
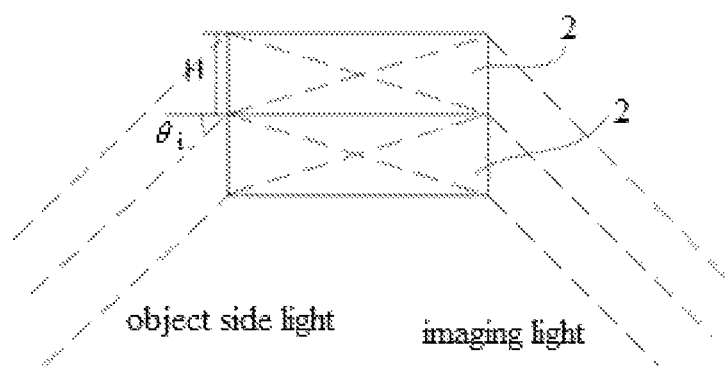
FIG. 7 is a schematic view of light incidence of an optical waveguide unit according to embodiments of the present disclosure.

As illustrated in FIGS. 5 and 6, when an optical waveguide unit includes one type of optical waveguide, as the angle of incident light changes, there will be a lossless region angle and a lossy region angle in the optical waveguide unit when the light is incident. As illustrated in FIG. 6, for the lossy region angle, the light in the lossy region may not participate in the imaging, but loses the energy of the imaging beam as stray light. In the angular distribution of light energy, the energy corresponding to the angle in the lossless region is the largest, and the light energy greater than or less than the angle is reduced, resulting in the decrease of the angular uniformity of the imaging beam. Based on the above problem, the inventor proposes that it is possible to design the plurality of sub waveguides in the optical waveguide unit, and collect the energy of the lossy region by changing height H of the cross section, as illustrated in FIG. 7, thereby improving the energy collection of the light corresponding to the sub waveguide at angle $\theta_i$, in which $\theta_i$ is the lossless region angle for the cross-section length Hi of this type of sub optical waveguide.

Based on this, energy distribution is performed for different object-side light incident angles by introducing sub waveguides with plurality types of cross-section lengths H. In the example illustrated in FIG. 8, two types of sub waveguides are used in one optical waveguide unit, and different types of sub waveguides have corresponding lossless regions $\theta_a$, $\theta_b$. The cross-section sizes of the energy collected by light beams of different sub waveguides in different lossless region angles are related to heights Hi of the cross sections of the sub waveguides. The sub waveguide with the large cross-sectional height Hi has the large energy collected by the corresponding angle of the lossless region, and the sub waveguide with the small cross-sectional height Hi has the small energy collected by the corresponding angle of the lossless region. Therefore, the number of the sub waveguides with the small cross-sectional height Hi needs to be larger than that with the large cross-sectional height Hi.

Therefore, in some embodiments of the present disclosure, there are a plurality of categories for the plurality of sub waveguides, heights of sub waveguides in each category are the same, in which a height of a $i^{th}$ category satisfies:

$$H_i = W \cdot \tan(\arcsin(\sin(\theta_i)/n))/\sqrt{2},$$

where $\theta_i$ is a predetermined angle selected within an observation angle range, that is, the incident angle of the beam when the light just satisfies the lossless region, which is also the angle of view to be modulated for the corresponding sub waveguide, and n is a refractive index of the sub waveguide.

Heights of the plurality of categories are inversely proportional to the numbers of corresponding sub waveguides 2 in the plurality of categories. In other words, the smaller the cross-sectional height Hi is, the more the number of sub waveguides is.

Figure 8:
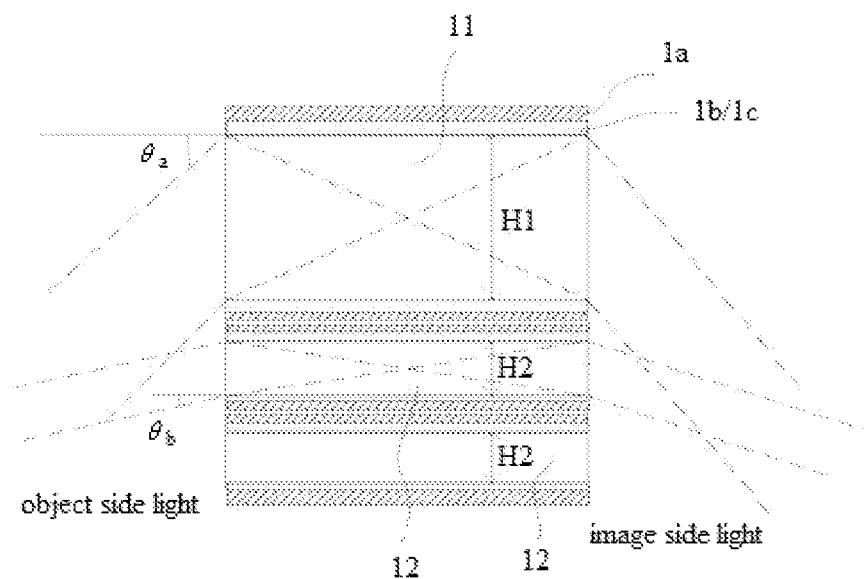
FIG. 8 is a schematic view of an optical waveguide unit according to an embodiment of the present disclosure.

In the embodiments illustrated in FIG. 8, the optical waveguide unit 100 includes two categories of sub waveguides 11 and 12. The height H1 of the sub waveguides 11 is larger than the height H2 of the sub waveguides 12. The number (i.e., 1) of the sub-waveguides 11 is smaller than the number (i.e., 2) of the sub-waveguides 12. In this way, the energy of different incident light may be collected.

Figure 9:
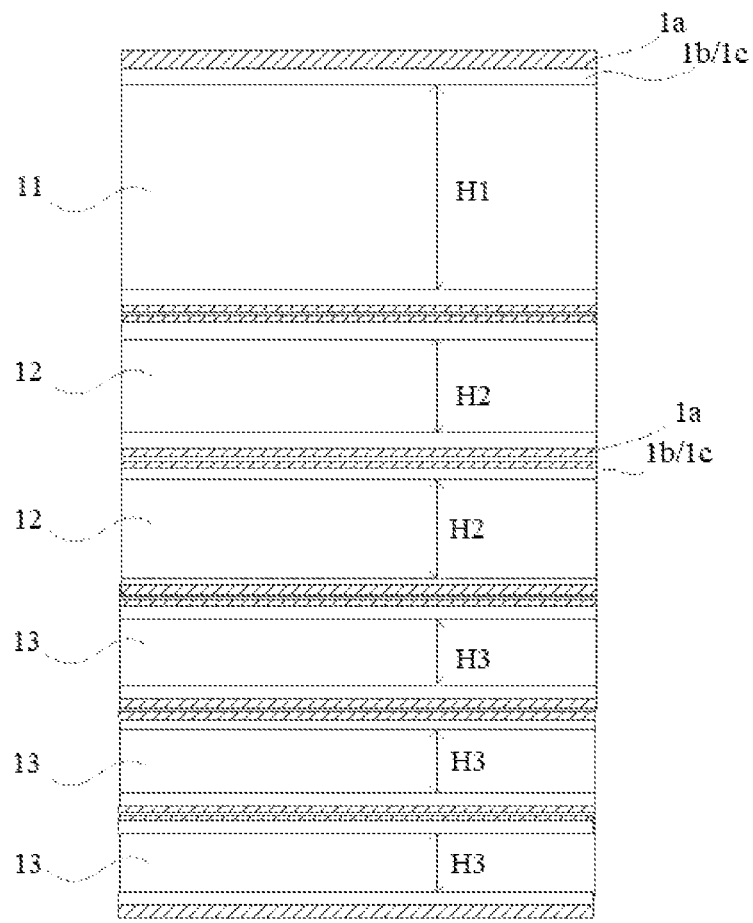
FIG. 9 is a schematic view of an optical waveguide unit according to another embodiment of the present disclosure.

In the embodiments illustrated in FIG. 9, the optical waveguide unit 100 includes three categories of sub waveguides 11, 12 and 13. The height H1 of the sub waveguides 11 is the largest and the number of the sub waveguides 11 is the smallest (i.e., one). The height H3 of the sub waveguides 13 is the smallest and the number of the sub waveguides 13 is the largest (i.e., three). The height H2 of the sub waveguides 12 satisfies: H3<H2<H1, and the number of the sub waveguides 12 is two. Thus, energy distribution of three lossless region angles is realized by providing three categories of sub waveguides having three types of cross-sectional heights H in one optical waveguide unit 100, which may improve the uniformity of energy of the imaging beam over the entire imaging angle of view.

Of course, the embodiments described above with reference to FIGS. 8 and 9 are alternative examples according to the present disclosure, i.e. arranged in height from large to small. However, in the present disclosure, the arrangement order of the sub waveguides is not limited. In other words, the sub waveguides 2 with different cross-sectional heights may be arranged in any order, for example, may be arranged from small to large according to the height, may be large first, then small and then large, or may be small first, then large and then small, and which does not affect the distribution of energy at multiple incident light angles.

With the optical waveguide unit 100 according to the embodiments of the present disclosure, the sub waveguides with the plurality of heights are set and different visual angles are modulated under the plurality of heights, so that the energy of a plurality of lossless region angles may be allocated, and the uniformity of the energy of an imaging light beam in the whole imaging visual angle range may be improved.

According to some embodiments of the present disclosure, in order to prevent the imaging quality of the optical waveguide array from being affected by diffraction, the cross-sectional height of the sub waveguide 2 may not be too small, and may be larger than 0.1 mm Meanwhile, in order to improve the clear imaging of the optical waveguide array for the object point, the cross-sectional height H of the sub waveguide 2 may not be too large, and may be smaller than 5 mm. In other words, the cross-sectional height H of each sub waveguide 2 satisfies 0.1 mm<H<5 mm. Alternatively, the sub waveguide 2 has a refractive index n>1.46.

Figure 10:
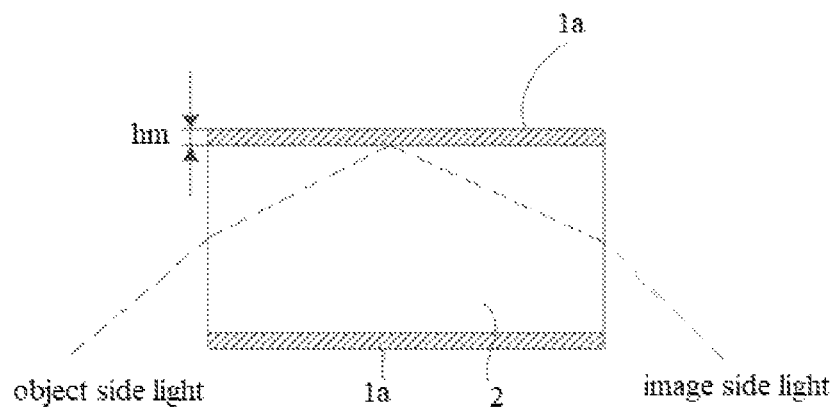
FIG. 10 is a schematic view of an optical waveguide unit according to an embodiment of the present disclosure, in which a reflection unit is a metal layer.

According to some embodiments of the present disclosure, the reflection unit 1 is a metal layer 1a. As illustrated in FIG. 10, the metal layer 1a may be made of a metal material such as silver, aluminum, or chromium. The height hm of the metal layer 1a satisfies: 0.001 mm<hm<0.1 mm. The metal layer 1a may be used as an optical reflecting surface with a high smoothness, mainly plays a role in reflecting and blocking light. The light is easy to scatter to generate stray light due to bubbles, impurities, dust and the like, and the light may be isolated from entering a receiving component such as a detector or human eyes through the metal layer 1a. Alternatively, one type metal layer is included in the metal layer 1a.

Figure 11:
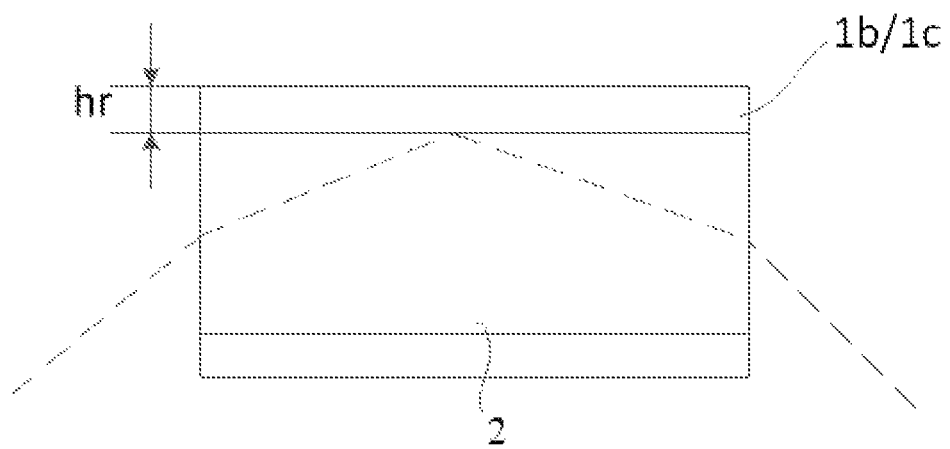
FIG. 11 is a schematic view of an optical waveguide unit according to another embodiment of the present disclosure, in which a reflecting unit is a total reflection layer or an interference type medium reflecting layer.

According to some embodiments of the present disclosure, the reflection unit 1 may be a total reflecting layer 1b (as illustrated in FIG. 11). The material of the total reflecting layer 1b may be a transparent optical material such as resin, glass, crystal, which may perform the function of reflecting light by means of total reflection, and the total reflection effect may make the incident light reflected almost without loss, thereby the reflectivity of the total reflecting layer is greatly improved. The refractive index range $n_{ei}$ of the total reflecting layer 1b is calculated by the following formula of:

$$n_{ei} = \sqrt{n^2 - 0.5 \cdot \sin(\theta_{ei})^2}$$

where $\theta_{ei}$ is a maximum incident angle of a surface of the optical waveguide unit 100 when a total reflection condition is satisfied, and n is a refractive index of the sub waveguide 2.

The height hr of the total reflecting layer 1b satisfies: 0.004 mm<hr<(0.1H), where H is a height of the corresponding sub waveguide 2 where the total reflecting layer 1b is located. The thickness of the total reflecting layer is larger than 0.004 mm, so that the total reflecting layer 1b is prevented from being invalid due to the fact that the thickness of the total reflecting layer 1b is smaller than the penetration depth of the total reflection evanescent wave. Furthermore, the thickness of the total reflecting layer 1b should not be too large to prevent light from entering the total reflecting layer, resulting in light deflection caused by different refractive indexes of the total reflecting layer and the optical waveguide layer, which affects imaging clarity.

According to some embodiments of the present disclosure, the reflection unit 1 is an interference type medium reflecting layer 1c, as illustrated in FIG. 11. The reflection characteristic is that the incident light is reflected by the interference of the transparent medium, the reflectivity of the reflecting film layer is higher than that of other metal film layers, and the reflectivity of the light may be greatly improved. The interference type medium reflecting layer 1c includes one or more transparent medium film layers of the following types: a ¼ wavelength film, and a ½ wavelength film, in which an optical thickness of the ¼ wavelength film is ¼ of the incident light wavelength, and an optical thickness of the ½ wavelength film is ½ of the incident light wavelength.

The optical thickness of the film layer $T = n_g \cdot l$, where $n_g$ is a refractive index of material of the film layer, and l is a thickness of the film layer.

The transparent medium may be crystal materials such as magnesium fluoride, silicon monoxide, and silicon dioxide.

Alternatively, height hj of the medium reflecting layer 1c satisfies: hj<(0.1H), where H is the height of the corresponding sub waveguide where the total reflection layer is located.

Figure 12:
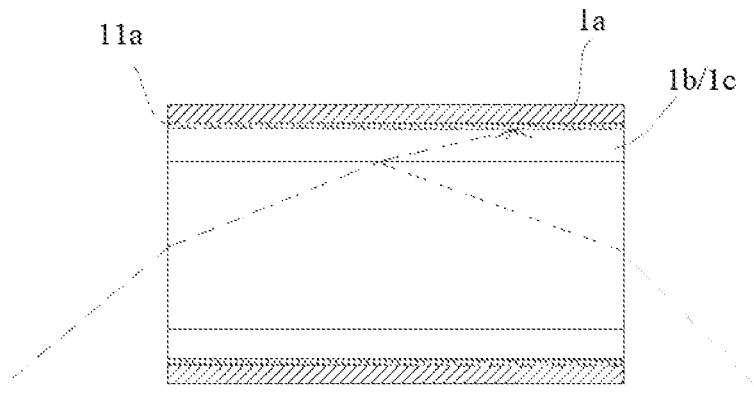
FIG. 12 is a schematic view of an optical waveguide unit according to an embodiment of the present disclosure, in which a reflecting unit is a combination of a metal layer and a total reflection layer or an interference type medium reflecting layer.
Figure 13:
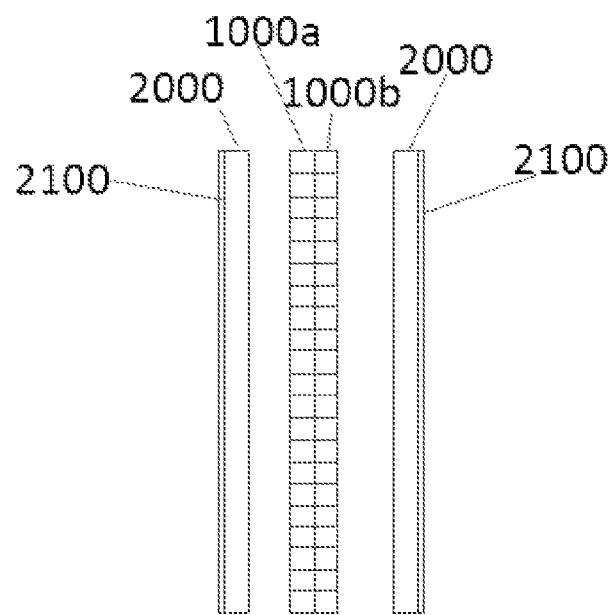
FIG. 13 is a schematic view of a flat lens according to embodiments of the present disclosure.

According to some embodiments of the present disclosure, when the reflecting unit 1 is a combination of the metal layer 1a and the total reflecting layer 1b, or a combination of the metal layer 1a and the medium reflecting layer 1c, a surface of the metal layer 1a facing the corresponding sub waveguide 2 has a preset roughness; and/or the metal layer 1a is a metal film layer blackened by oxidation. In some alternative examples, the surface of the metal layer 1a facing the corresponding sub waveguide 2 may be formed as a rough surface 11a having a preset roughness for scattering light transmitted through the total reflecting layer 1b or the medium reflecting layer 1c, as illustrated in FIG. 12. In other alternative examples, the surface of the metal layer 1a facing the corresponding sub waveguide 2 may be provided as the metal film layer blackened by oxidation for absorbing the absorbed light transmitted by the total reflecting layer 1b or the medium reflecting layer 1c. Of course, in other examples of the present disclosure, the metal layer 1a may be provided with both the rough surface 11a and the oxidized blackened surface, which may be used to absorb light transmitted from the total reflecting layer or the medium reflecting layer 1c and scatter the remaining light.

Alternatively, when the metal layer 1a and the total reflecting layer 1b are included in the reflecting unit 1 of the embodiments, the total reflecting layer 1b may further control an outgoing light angle. When an incident angle of an incident light does not satisfy a total reflection condition of the total reflecting layer 1b, the light transmitted through the total reflection layer 1b may reach the metal layer and be scattered or absorbed, thereby controlling an angular light outgoing, as illustrated in FIG. 12.

A flat lens according to embodiments of the third aspect of the present disclosure may be described below with reference to FIG. 11, which includes two transparent substrates 2000 and two optical waveguide arrays 1000a, 1000b according to the above embodiments.

Each of the transparent substrates 2000 has two optical surfaces, and the optical surfaces are used to protect the optical waveguide arrays 1000a, 1000b. The two optical waveguide arrays may be arranged between the two transparent substrates 2000 by means of glue, and optical waveguide extending directions of the two optical waveguide arrays may be arranged orthogonally. In other words, the extending directions of the optical waveguide units are mutually perpendicular, so that light beams are converged at one point. Furthermore, the object-image surface is ensured to be symmetrical relative to the equivalent flat lens with the negative refractive index, a negative-refractive-index phenomenon is generated, and imaging of the flat lens is realized.

Alternatively, the optical waveguide array and the transparent substrate 2000 are also bonded by a photosensitive adhesive or a heat-sensitive adhesive.

According to some embodiments of the present disclosure, as illustrated in FIG. 11, the optical surface of each transparent substrate 2000 far away from the optical waveguide array is provided with an antireflection film 2100 to further improve the imaging effect.

With the flat lens provided by the embodiments of the present disclosure, the array structure is formed by adopting the optical waveguides with single-column multi-row and rectangular cross section, so that a two-dimensional (2D) or 3D light source may directly realize real imaging in the air, the real holographic image is realized, the imaging effect is good, and the naked eye 3D display characteristic is realized. In addition, the optical waveguide unit formed by stacking the sub waveguides 2 with the plurality of heights separated by the reflection unit 1 may improve the uniformity of the imaging visual angle and improve user experience to a certain extent.

Reference throughout this specification to "an embodiment," "some embodiments," "one embodiment", "another example," "an example," "a specific example," or "some examples," means that a particular feature, structure, material, or characteristic described in connection with the embodiments or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiments or example of the disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the disclosure, and changes, alternatives, and modifications can be made in the embodiments without departing from spirit, principles and scope of the disclosure.

What is claimed is:

1. An optical waveguide unit, comprising:
a plurality of reflecting units being the same in structure, each reflecting unit being any one or a combination of any two of: a metal layer, a total reflecting layer, and a medium reflecting layer; and
a plurality of sub waveguides stacked on each other, each of two sides of each sub waveguide being provided with one reflecting unit, at least two of the plurality of sub waveguides having different heights in a stacking direction of the plurality of sub waveguides, and the different heights of the sub waveguides being corresponding to different incident angle directions,
wherein there are a plurality of categories for the plurality of sub waveguides, heights of sub waveguides in each category are the same, and a height of a $i^{th}$ category satisfies:

$$H_i = W \cdot \tan(\arcsin(\sin(\theta_i)/n))/\sqrt{2},$$

where $\theta_i$ is a predetermined angle selected within an observation angle range, n is a refractive index of the sub waveguide; and
wherein heights of the plurality of categories are inversely proportional to numbers of corresponding sub waveguides in the plurality of categories.

2. The optical waveguide unit according to claim 1, wherein the height of each sub waveguide ranges from 0.1 mm to 5 mm.

3. The optical waveguide unit according to claim 1, wherein a refractive index of each sub waveguide is n>1.46.

4. The optical waveguide unit according to claim 1, wherein the reflecting unit is one of: the metal layer, the metal layer and the total reflecting layer, and the metal layer and the medium reflecting layer.

5. The optical waveguide unit according to claim 4, wherein the metal layer is made of silver, aluminum, or chromium, and height hm of the metal layer satisfies: 0.001 mm<hm<0.1 mm.

6. The optical waveguide unit according to claim 4, wherein when the reflecting unit is the metal layer and the total reflecting layer or the metal layer and the medium reflecting layer, a surface of the metal layer facing the corresponding sub waveguide has a preset roughness; and/or the metal layer is a metal film layer blackened by oxidation.

7. The optical waveguide unit according to claim 1, wherein the reflecting unit is the total reflecting layer, and a refractive index range $n_{ei}$ of the total reflecting layer is calculated by a formula of:

$$n_{ei} = \sqrt{n^2 - 0.5 \cdot \sin(\theta_{ei})^2},$$

where, $\theta_{ei}$ is a maximum incident angle of a surface of the optical waveguide unit when a total reflection condition is satisfied, and n is a refractive index of the sub waveguide.

8. The optical waveguide unit according to claim 7, wherein height hr of the total reflecting layer satisfies: 0.004 mm<hr<(0.1H), where H is a height of the corresponding sub waveguide where the total reflection layer is located.

9. The optical waveguide unit according to claim 1, wherein the reflecting unit is an interference type medium reflecting layer, the interference type medium reflecting layer comprises one or more transparent medium film layers of the following types: a ¼ wavelength film, and a ½ wavelength film, in which an optical thickness of the ¼ wavelength film is ¼ of an incident light wavelength, and an optical thickness of the ½ wavelength film is ½ of the incident light wavelength;
wherein the optical thickness of the film layer $T = n_g \cdot l$, where $n_g$ is a refractive index of material of the film layer, and l is a thickness of the film layer.

10. The optical waveguide unit according to claim 9, wherein height hj of the medium reflecting layer satisfies: hj<(0.1H), where H is a height of the corresponding sub waveguide where the medium reflection layer is located.

11. An optical waveguide array, comprising:
a plurality of optical waveguide units, each optical waveguide unit comprising:
a plurality of reflecting units being the same in structure, each reflecting unit being any one or a combination of any two of: a metal layer, a total reflecting layer, and a medium reflecting layer; and
a plurality of sub waveguides stacked on each other, each of two sides of each sub waveguide being provided with one reflecting unit, at least two of the plurality of sub waveguides having different heights in a stacking direction of the plurality of sub waveguides, and the different heights of the sub waveguides being corresponding to different incident angle directions, wherein there are a plurality of categories for the plurality of sub waveguides, heights of sub waveguides in each category are the same, and a height of a $i^{th}$ category satisfies:

$$H_i = W \cdot \tan(\arcsin(\sin(\theta_i)/n))/\sqrt{2},$$

where $\theta_i$ is a predetermined angle selected within an observation angle range, n is a refractive index of the sub waveguide; and wherein heights of the plurality of categories are inversely proportional to numbers of corresponding sub waveguides in the plurality of categories, each optical waveguide unit having a rectangular cross section, and the plurality of optical waveguide units being joined in parallel;

an outer contour of the optical waveguide array is rectangular, and an extending direction of the optical waveguide unit and at least two sides of the outer contour of the optical waveguide array form an angle of 30 to 60 degrees.

12. The optical waveguide array according to claim 11, wherein the extending direction of the optical waveguide unit and the at least two sides of the outer contour of the optical waveguide array form an angle of 45 degrees.

13. The optical waveguide array according to claim 11, wherein the plurality of optical waveguide units are joined through an adhesive layer, and a thickness of the adhesive layer is more than 0.001 mm.

14. A flat lens, comprising:

two transparent substrates, each transparent substrate having two optical surfaces; and two optical waveguide arrays, each optical waveguide array comprising a plurality of optical waveguide units, each optical waveguide unit comprising:

a plurality of reflecting units being the same in structure, each reflecting unit being any one or a combination of any two of: a metal layer, a total reflecting layer, and a medium reflecting layer; and a plurality of sub waveguides stacked on each other, each of two sides of each sub waveguide being provided with one reflecting unit, at least two of the plurality of sub waveguides having different heights in a stacking direction of the plurality of sub waveguides, and the different heights of the sub waveguides being corresponding to different incident angle directions, wherein there are a plurality of categories for the plurality of sub waveguides, heights of sub waveguides in each category are the same, and a height of a $i^{th}$ category satisfies:

$$H_i = W \cdot \tan(\arcsin(\sin(\theta_i)/n))/\sqrt{2},$$

where $\theta_i$ is a predetermined angle selected within an observation angle range, n is a refractive index of the sub waveguide; and wherein heights of the plurality of categories are inversely proportional to numbers of corresponding sub waveguides in the plurality of categories, each optical waveguide unit having a rectangular cross section, and the plurality of optical waveguide units being joined in parallel;

an outer contour of the optical waveguide array is rectangular, and an extending direction of the optical waveguide unit and at least two sides of the outer contour of the optical waveguide array form an angle of 30 to 60 degrees;

the two optical waveguide arrays being arranged between the two transparent substrates by means of glue, and optical waveguide extending directions of the two optical waveguide arrays being arranged orthogonally.

15. The flat lens according to claim 14, wherein an optical surface of each transparent substrate far away from the optical waveguide array is provided with an antireflection film.

* * * * *